(12) United States Patent
Kissner et al.

(10) Patent No.: US 8,010,521 B2
(45) Date of Patent: Aug. 30, 2011

(54) SYSTEMS AND METHODS FOR MANAGING FOREIGN KEY CONSTRAINTS

(75) Inventors: Jürgen G. Kissner, Schoenborn (DE); Andreas Fischbach, Eppelheim (DE)

(73) Assignee: SAP AG, Walldorf (DE)

( * ) Notice: Subject to any disclaimer, the term of this patent is extended or adjusted under 35 U.S.C. 154(b) by 291 days.

(21) Appl. No.: 12/382,739

(22) Filed: Mar. 23, 2009

(65) Prior Publication Data
US 2010/0241637 A1    Sep. 23, 2010

(51) Int. Cl.
*G06F 17/30* (2006.01)
(52) U.S. Cl. .................................... 707/713
(58) Field of Classification Search ............. 707/7, 100, 707/200, 713; 706/45
See application file for complete search history.

(56) References Cited

U.S. PATENT DOCUMENTS

| | | | |
|---|---|---|---|
| 5,819,254 A | 10/1998 | Kawai | |
| 6,070,165 A * | 5/2000 | Whitmore | 1/1 |
| 6,377,943 B1 * | 4/2002 | Jakobsson | 1/1 |
| 6,456,995 B1 | 9/2002 | Salo et al. | |
| 2003/0187855 A1 * | 10/2003 | Fachat et al. | 707/100 |
| 2005/0033742 A1 * | 2/2005 | Kamvar et al. | 707/7 |
| 2008/0005183 A1 * | 1/2008 | Bostick et al. | 707/200 |
| 2008/0228697 A1 | 9/2008 | Adya et al. | |
| 2008/0275833 A1 * | 11/2008 | Zhou et al. | 706/45 |

OTHER PUBLICATIONS

Communication from the European Patent Office dated Sep. 15, 2010 in European Application EP 10 00 2815, 8 pages.

* cited by examiner

*Primary Examiner* — Etienne P LeRoux
(74) *Attorney, Agent, or Firm* — Finnegan, Henderson, Farabow, Garrett & Dunner, LLP (57) ABSTRACT

Systems and methods consistent with the invention may include generating, via a processor, an entity relationship model to indicate a plurality of types of relationships between the entities, determining relationships between the database tables corresponding to the entities by using the entity relationship model, wherein the database tables are stored in a computer memory device, generating a graph based on the entity relationship model, generating sets of database elements representing the entities and corresponding data objects stored in the database tables, wherein the element sets are generated based on the generated graph, assigning ordering numbers to the database element sets and database elements included in the database element sets and executing the query transaction by using the data objects in an order based on the ordering numbers.

20 Claims, 5 Drawing Sheets

SYSTEMS AND METHODS FOR MANAGING FOREIGN KEY CONSTRAINTS

BACKGROUND

1. Relevant Field

Systems and methods consistent with the present invention generally relate to the management of database objects and/or entries. More particularly, systems and methods consistent with the invention relate to the managing data objects by resolving foreign key constraints to process database queries.

2. Background Information

Businesses and other organizations generate and/or receive a variety of entries, data items and electronic information (broadly referred to hereafter as "data objects") during the course of their operation. These data objects may belong to different classes and may be generated and/or received from various locations in different regions and/or countries. To organize and manage operations of the organization, data objects may be stored in storage devices located in a variety of locations. These storage devices may include relational databases that store the data objects as tables of data, where the tables may consist of rows and columns and may represent relations between the stored data.

The relationships between data objects stored in various database tables may be constrained by using foreign keys. For example, a foreign key may be used to establish and enforce a link between data objects stored in two tables. A foreign key may be a referential constraint between two tables that may identify a column or a set of columns in a referencing database table that may refer to a column or set of columns of a referenced table. Foreign keys may be used to enforce constraints by linking information together and may provide database normalization during processing of database transactions.

During operation, customers or employees of an organization may need to issue queries and process query transactions by using data objects that may be in relational databases. Mainly, an entity may enter a query such as a Structured Query Language (SQL) statement to insert, and/or update, and/or delete one or more data objects from a database. In conventional systems the execution of such a query may fail when a constraint enforced by a foreign key may be violated. Conventional systems, therefore, may execute statements in a particular order and to resolve foreign key constraints before execution of a query.

Figure 1:
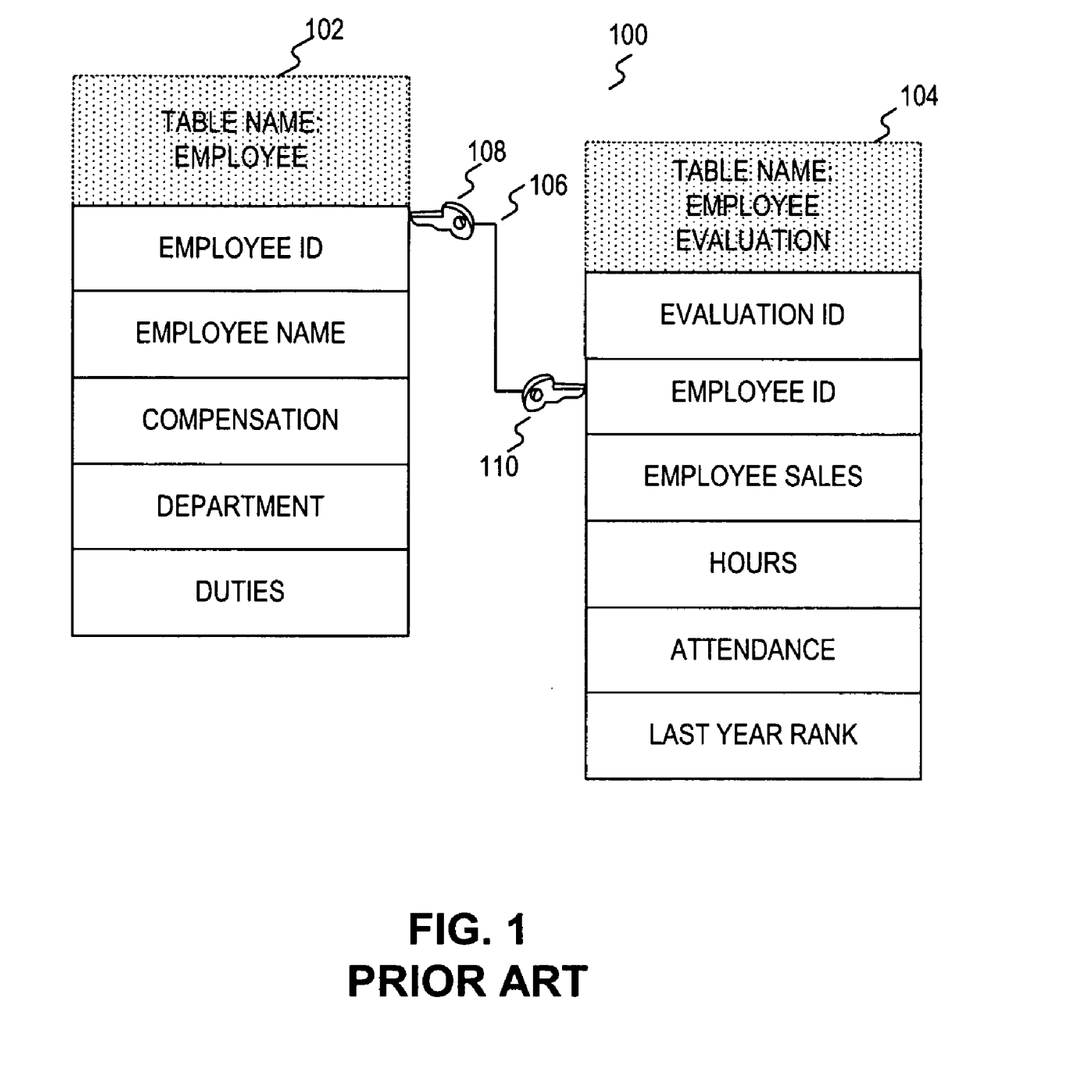
FIG. 1 illustrates a schematic diagram of a conventional database system.

For example, FIG. 1 illustrates a database system 100, in which database tables 102 and 104 that may be linked together by relationship 106. As is illustrated in FIG. 1, the name of database table 102 may be "EMPLOYEE" such that database table 102 belongs to class "EMPLOYEE" and includes data objects describing information with respect to employees of an organization. The class of a database table may also be referred to as an entity such that each entity may have one database table that may be used to store data objects of the entity. The data objects of an entity may also be referred to as instances of the entity. For example, the columns of database table 102 may include instances "EMPLOYEE ID," "EMPLOYEE NAME," "COMPENSATION," "DEPARTMENT," and "DUTIES," of the entity "EMPLOYEE."

The name of database table 104 may be "EMPLOYEE EVALUATION" such that database table 104 belongs to entity "EMPLOYEE EVALUATION" and includes data objects describing information with respect to evaluations of employees of the organization. The columns of database table 104 may include instances "EVALUATION ID," "EMPLOYEE ID," "EMPLOYEE SALES," "HOURS," "ATTENDANCE," and "LAST YEAR RANK" of the entity "EMPLOYEE EVALUATION." Database table 104 may have a link 106 to database table 102 because there is a relationship between "EMPLOYEE" and "EMPLOYEE EVALUATION." The "EMPLOYEE ID" column in database table 104 may match the "EMPLOYEE ID" column in database table 102, where the "EMPLOYEE ID" column of database table 102 may be a primary key column 108 of database table 102 and the "EMPLOYEE ID" column of database table 104 may be a foreign key column 110 to database table 102.

Foreign key column 110 may ensure that changes may not be made to data in database table 102 if those changes may invalidate link 106. To process queries or perform query transaction that may require the insertion, deletion, and/or updating of data objects or instances stored in database tables 102 and 104, a constraint enforced by foreign key column 110 may need to be resolved first. Similarly, database tables 102 and 104 may have multiple foreign keys (not shown), and each foreign key constraint may reference a different table. Each foreign key constraint may then be resolved independently by database system 100 and resolution of constraints may require execution of statements in a specific order. Such techniques may require resource intensive computations and may lead to delay in execution of issued queries and SQL statements.

In view of the foregoing, it is desirable to provide methods and systems for reducing the time and computations required to execute queries that may require data objects stored in relational databases. For example, there is a need for improved methods and systems to resolve foreign key constraints more efficiently and by using less resource intensive techniques.

SUMMARY

Consistent with embodiments of the present inventions, systems, methods and computer readable media are disclosed for executing relational database queries.

Embodiments and implementations consistent with the invention provide methods and systems for executing a query transaction by using data objects stored in database tables corresponding to entities of an organization. The methods and systems may include generating, via a processor, an entity relationship model to indicate a plurality of types of relationships between the entities; determining relationships between the database tables corresponding to the entities by using the entity relationship model, wherein the database tables are stored in a computer memory device; generating a graph based on the entity relationship model; generating sets of database elements representing the entities and corresponding data objects stored in the database tables, wherein the element sets are generated based on the generated graph; assigning ordering numbers to the database element sets and database elements included in the database element sets; and executing the query transaction by using the data objects in an order based on the ordering numbers.

In another embodiment consistent with the present invention, there is provided a computer-implemented system for executing a query transaction by using data objects stored in database tables corresponding to entities of an organization. The system may include a memory device including a plurality of modules; and a data processor for executing the plurality of modules to generate an entity relationship model to indicate a plurality of types of relationships between the entities; determine relationships between the database tables corresponding to the entities by using the entity relationship model, wherein the database tables are stored in a computer memory device; generate a graph based on the entity relationship model; generate sets of database elements representing the entities and corresponding data objects stored in the database tables, wherein the element sets are generated based on the generated graph; assign ordering numbers to the database element sets and database elements included in the database element sets; and execute the query by using the data objects in an order based on the ordering numbers.

Consistent with another embodiment of the present invention, there is provided a computer-readable storage medium comprising instructions, which when executed on a processor, cause the processor to perform a method of executing a query transaction by using data objects stored in database tables corresponding to entities of an organization. The method may include generating an entity relationship model to indicate a plurality of types of relationships between the entities; determining relationships between the database tables corresponding to the entities by using the entity relationship model; generating a graph based on the entity relationship model; generating sets of database elements representing the entities and corresponding data objects stored in the database tables, wherein the element sets are generated based on the generated graph; assigning ordering numbers to the database element sets and database elements included in the database element sets; and executing the query transaction by using the data objects in an order based on the ordering numbers.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to optimizing the process of executing queries, such as SQL statements. Exemplary Java Platform Enterprise Edition (JEE) engines may be used in systems consistent with the invention including those offered by SAP AG, such SAP NetWeaver® Application Server Java EE Edition. SAP NetWeaver® Application Server Java EE Edition may integrate information and business processes across technologies and organizations using Internet standards such as HTTP, XML, and Web services and may resolve foreign key constraints to execute queries by using data objects stored in relational databases.

Figure 2:
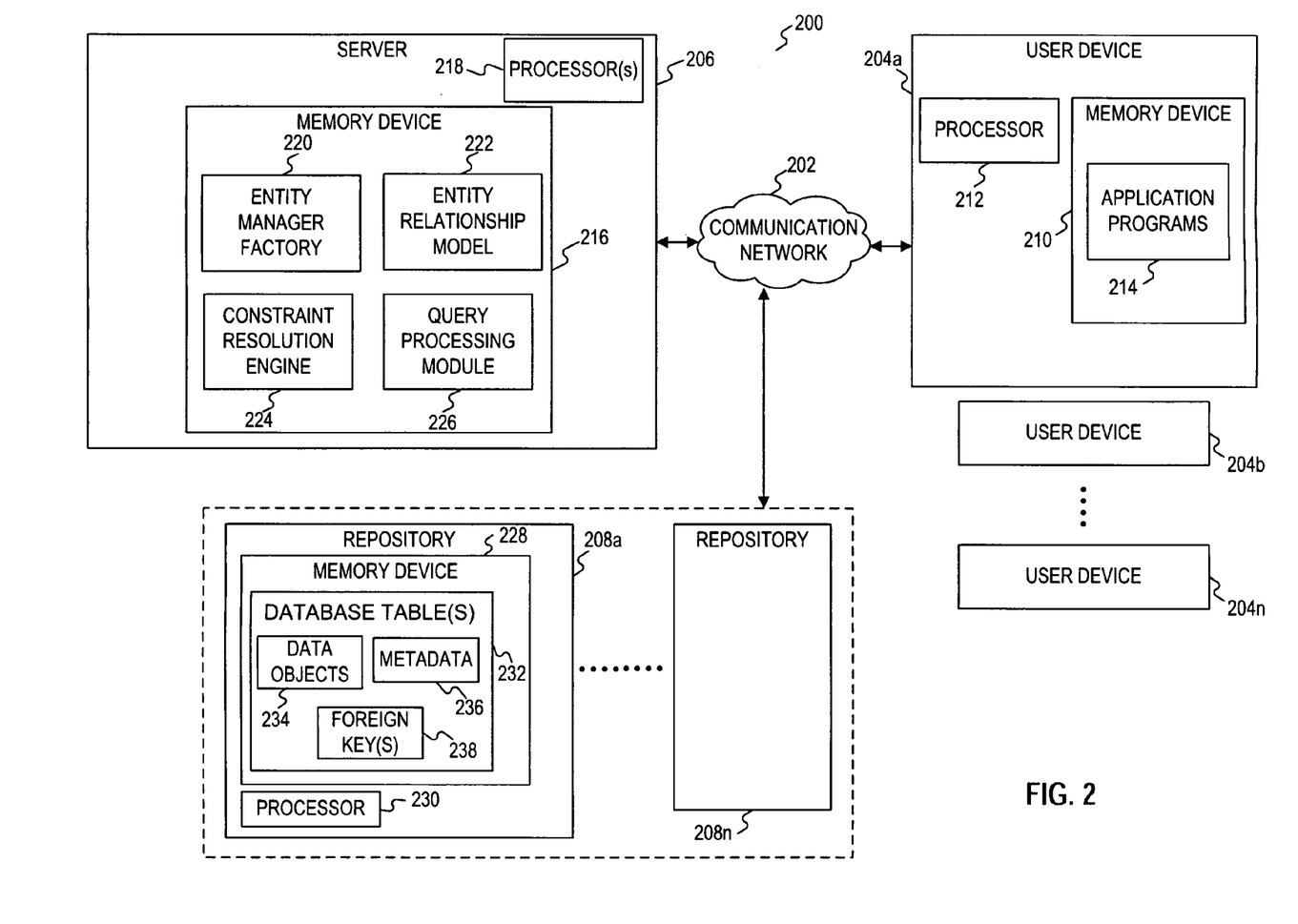
FIG. 2 illustrates an exemplary system for optimizing execution of database queries, consistent with the present invention.

For example, FIG. 2 illustrates an exemplary system 200, which may be implemented using an SAP NetWeaver® Application Server Java EE Edition. System 200 may thus facilitate management of classes of data objects, generated and/or stored by an organization during the course of operations. Specifically, the components of system 200 may be adapted to process queries that may insert a data object, delete a data object, and/or update a data object stored in relational databases. The processing of queries may include issuing a query in relation to data objects, resolving constraints related to foreign keys and the data objects, and execution of the query after resolution of the foreign key constraints.

As shown in FIG. 2, system 200 includes a communication network 202 that facilitates communication between a plurality of nodes 204*a-n*, 206, and 208*a-n*. Communication network 202 includes one or more network types, such as a wide-area network (WAN), a local-area network (LAN), or the Internet. Communication network 202 may operate by wireline and/or wireless techniques and may use transmission control protocol/internet protocol ("TCP/IP") or any other appropriate protocol to facilitate communication between nodes 204*a-n*, 206, and 208*a-n* of system 200. Network connections between the nodes of system 200 may be established via Ethernet, telephone line, cellular channels, or other transmission media.

Each node of system 200 comprises of a combination of one or more application programs and one or more hardware components. For example, application programs may include software modules, sequences of instructions, routines, data structures, display interfaces, and other types of structures that execute operations of the present invention. Further, hardware components may include a combination of Central Processing Units (CPUs), buses, memory devices, storage units, data processors, input devices, output devices, network interface devices and other types of components that will become apparent to those skilled in the art.

Consistent with an embodiment of the present invention, nodes 204*a-n*, 206, and 208*a-n* of system 200 may be respectively implemented by using user devices 204*a-n*, server 206, and repositories 208*a-n*. User device 204*a* may be an appropriate device for sending, receiving, and presenting data. For example, user device 204*a* may include a personal computer, workstation, mainframe computer, notebook, global positioning device, and a handheld device such as a cellular phone and a personal digital assistant.

As is illustrated in FIG. 2, user device 204a may include a memory device 210 and a processor 212. Memory device 210 may be used to store instructions, such as application programs 214, which may be executed by processor 212 to cause user device 204a to implement a plurality of operations. User device 204a may also include additional components such as input and output devices (not shown). User devices 204b-n may also include memory devices, processors, and application programs.

User devices 204a-n may communicate with server 206 via communication network 202. The communication includes sending data, such as issuing a query to server 206, and receiving data, such as receiving a result of an executed query, from server 206. Server 206 may be an SAP NetWeaver® Application Server Java EE Edition including a memory device 216 and one or more processors 218. Memory device 216 may include an entity manager factory (EMF) 220, entity relationship model 222, a constraint resolution engine 224, a query processing module 226, and other application programs (not shown), which may be executed using processor(s) 218. For example, server 206 may use EMF 220 to retrieve entity relationship model 222 that may define the classes of entities and the relationships between the classes, whose data objects may be stored in relational databases of system 200. Entity relationship model 222 may include predetermined relationships defined by an administrator or authorized personnel during programming of server 206. Constraint resolution engine 224 may then use the entity relationship model 222 to resolve foreign key constraints when query processing module 226 may receive a query from user device 104a.

Repositories 208a-n may be used to classify, manage, and store data objects in databases. Repositories 208a-n may be located in different regions and may be a database management system such as MaxDB from SAP AG. Repository 208a may include a memory device 228 and a processor 230. Memory device 228 may include database table(s) 232, that may be used to store data objects 234, metadata 234, and foreign key(s) 238. Data objects 234 may be arranged in database table(s) 232 depending on the various entities defined in entity relationship model 222. Metadata 236 may correspond to stored data objects 234, and foreign key(s) 238 may be based on relationships between entities that may be defined in entity relationship model 222.

Database table(s) 232 may represent entities of an organization. An entity of an organization may have a corresponding database table for storing a collection of data objects 234 or instances belonging to the entity. An entity of a specific organization may have a relationship with another entity, and these relationships may be represented based on the relationship between the two database tables representing the two entities and stored in memory device 228.

The relationship between the entities may be hierarchical, non-hierarchical, one-to-one, one-to-many, many-to-one, and/or many-to-many. The relationships may also include constraints that may be enforced by using foreign key(s) 238. For example, database tables may represent entities within sales department of an organization. The related entities may include employees, customers, total purchased orders, customer support, billing, orders specific to a customer, orders to be shipped, and shipped orders. Each entity may be represented by a corresponding database table that may be used to store database objects or instances of the entity. In this example, a database table representing orders specific to customers may be linked to a database table representing total purchased orders, where a foreign key may be used to enforce a constraint. For example, when a user attempts to delete an instance or data object representing an entry within the database table of entity orders specific to a customer, the foreign key may prevent the deletion of the instance or data object until a corresponding instance or data object is deleted in total purchased orders. Thus, during execution of a query constraint resolution engine 224 may receive a foreign key 238 that may need to be resolved prior to execution of the query. The foreign key may be resolved by using entity relationship model 222 that may be retrieved by EMF 220 based on metadata 236.

Metadata 236 may describe the schema of database table(s) 232 and may be used to reflect the structure in which data objects 234 may be stored in. Metadata 236 may describe fields, columns, and rows of data objects 234 that may be stored in database table(s) 232 and may be used to retrieve data objects 234. Metadata 236 may also be used to describe relationships between database table(s) 232 and corresponding data objects 234.

Although the exemplary embodiment of system 200 is illustrated as having particular components arranged in a particular manner, one skilled in the art will appreciate that system 200 may include additional or fewer components that may be arranged differently. For example, user devices 204a-n, server 206, and repositories 208a-n may include additional processors and/or memory devices. System 200 may be implemented with a plurality of servers, and may include one or more repositories 208a-n. Memory devices 210, 216, and 128 may include all forms of non-volatile or volatile memory, including, by way of example, semiconductor memory devices, such as EPROM, RAM, ROM, DRAM, EEPROM, and flash memory devices; magnetic disks such as internal hard disks and removable disks; magneto-optical disks; and CD-ROM disks.

Consistent with an embodiment of the invention, server 206 may initialize EMF 220 to retrieve entity relationship model 222. Entity relationship model 222 may represent the relationships between classes of entities expressed by collections of data objects stored in, for example, database table(s) 232. Entity relationship model 222 may also indicate the dependencies between various entities and corresponding data objects. Entity relationship model 222 may be characterized by a directed graph representing the relationship and dependencies between various entities, where the relationships and dependencies represented in the directed graph may be equivalent to the relationships and dependencies between database tables of the entities. As used herein, the term "graph" broadly refers to any type of representation of a data relationship. For example, a "graph" or "directed graph" as used herein may correspond to a representation of a data relationship where the representation is implemented or modeled in memory device 216 and not for display to a user.

Figure 3A:
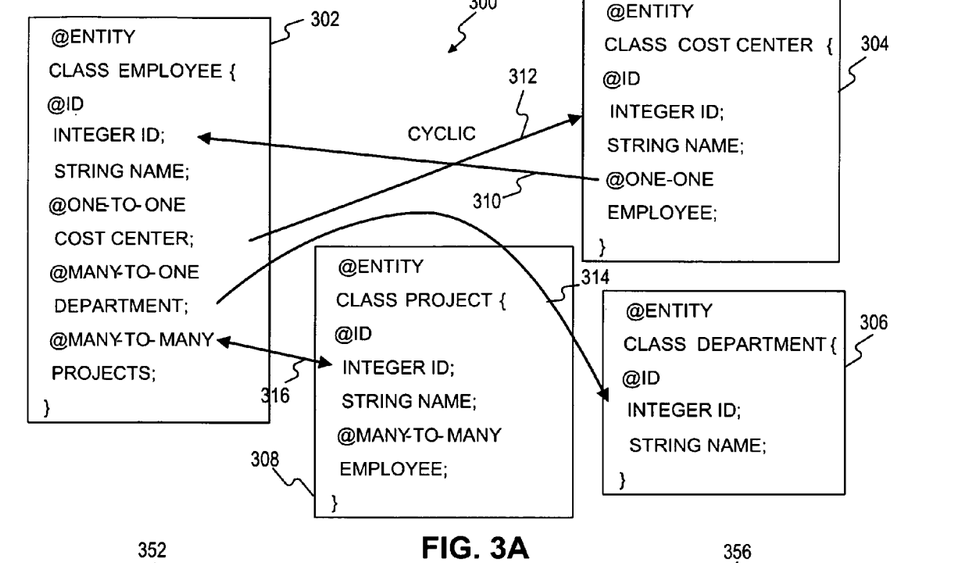
FIG. 3A illustrates an exemplary entity relationship model representing relationships between entities, consistent with the invention.
Figure 3B:
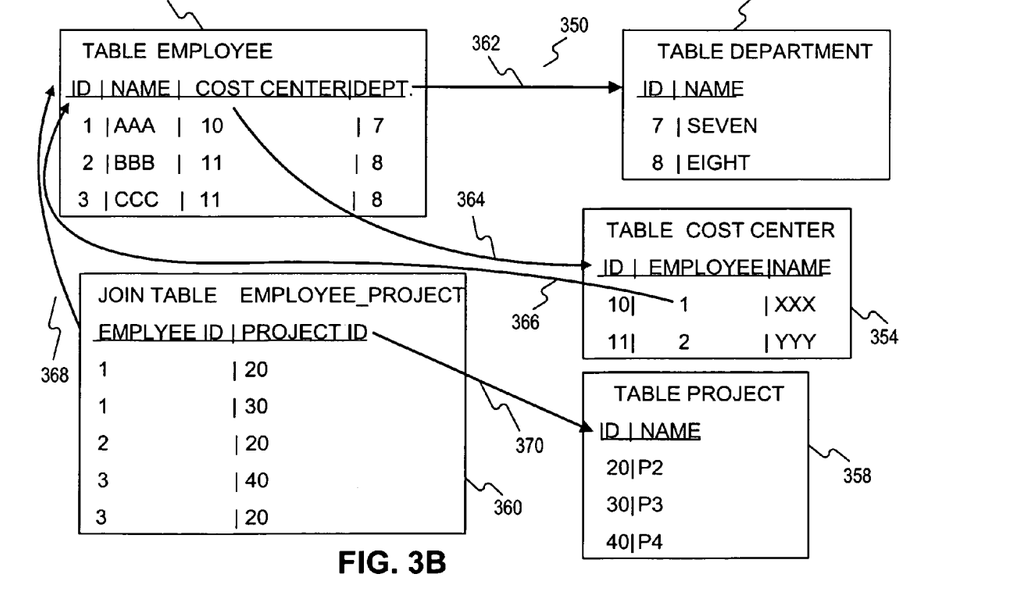
FIG. 3B illustrates an exemplary representation of relationships between database tables of corresponding entities, consistent with the invention.

After retrieval of entity relationship model 222, constraint resolution engine 224 may use the entity relationship model 222 to perform transactions and/or queries involving database table(s) 232 that store data objects 234 corresponding to the various entities. Constraint resolution engine 224 may also determine corresponding one or more foreign key constraints by determining one or more foreign keys 238 that may be included to enforce a specific relationship between database tables 232. The corresponding database tables 232, data objects 234, and foreign keys 238 may be determined by using metadata 236. FIGS. 3A and 3B respectively illustrate examples of an entity relationship model and a representation of relationships between database tables of corresponding entities. While the exemplary relationship models of FIGS. 3A and 3B are shown pictorially for purposes of explanation, those of ordinary skill in the art will understand that the relationship models may be readily implemented in memory device 216.

Referring now to FIG. 3A, an exemplary entity relationship model 300 representing relationships between entities of a business organization is illustrated. For example, entity relationship model 300 may be represented as a directed graph representing entities 302, 304, 306, and 308. Entity 302 may belong to class "EMPLOYEE" and may include fields "EMPLOYEE ID," "COST CENTER," "DEPARTMENT," and "PROJECTS." Entity 304 may belong to class "COST CENTER" and may include fields "COST CENTER ID" and "EMPLOYEE." Entity 306 may belong to class "DEPARTMENT" and may include a field "DEPARTMENT ID." Entity 308 may belong to class "PROJECT" and may include fields "PROJECT ID" and "EMPLOYEE."

As is illustrated by arrows 310 and 312 in FIG. 3A, there may be a cyclic relationship between entities 302 and 304 such that there may be a one-to-one relationship between field "EMPLOYEE" of entity 304 and field "EMPLOYEE ID" of entity 302 and a one-to-one relationship between field "COST CENTER" of entity 302 and field "COST CENTER ID" of entity 304. There may also be many-to-one relationships between entities 302 and 306 (represented by arrow 314) and many-to-many relationships between entities 302 and 308 (represented by double arrow 316). Entities 302, 304, 306, and 308 may correspond to database tables having data objects, where the relationships between two database tables may be constrained by one or more foreign keys.

For example, FIG. 3B illustrates a representation 350 of relationships between database tables of corresponding entities 302, 304, 306, and 308. As is illustrated in FIG. 3B, entities 302, 304, 306, and 308 may have corresponding database tables 352, 354, 356, and 358. Each database table may have several columns and rows that may be used to store data objects, also referred to as instances. Database table 360 may represent a join table that combines the records of database table 352 and database table 358. Database table 360 may represent the many-to-many relationships between database tables 352 and 358.

Arrows 362, 364, 366, 368, and 370 may be used to represent relationships between the database tables 352, 354, 356, 358, and 360, where one or more foreign keys may be used to constraint these relationships. For example, employee "AAA" may belong to department "SEVEN" only if department "SEVEN" is included in database table 356. To maintain this relationship, represented by arrow 362, a foreign key constraint in the database may prevent the deletion of department "SEVEN" before the deletion of employee "AAA" from database table 352.

Returning now to FIG. 2, constraint resolution engine 224 may generate a reduced graph based on the relationships between database tables of corresponding entities. Constraint resolution engine 224 may determine a set of database tables that may have one-to-many relationships and a set of database tables that may have many-to-many relationships. The one-to-many and many-to-many relationships may correspond to join tables included in the database tables. Using the generated sets, constraint resolution engine 224 may generate a reduced graph by removing the arrows that represent such relationships. For example, database table 360, arrow 368, and arrow 370 may be removed from representation 350 of FIG. 3B to generate a reduced graph.

Constraint resolution engine 224 may then sort the entities represented in entity relationship model 222 by applying a topological sorting process on the reduced relationships depicted in the reduced graph. For example, constraint resolution engine 224 may determine all the entities that may have a cyclic relationship between each other and may group these entities into cyclic sets. This may be done by grouping the vertices and/or nodes on the reduced graph that may represent the entities having cyclic relationships (arrows 364 and 366 in FIG. 3B).

The cyclic sets may be generated such that (1) each entity of a cyclic set corresponds to a vertex on the reduced graph that may belong to the same cyclic relationship as other entities in the cyclic set, and (2) no entity of a particular cyclic set may have a cyclic relationship between an entity included in a second cyclic set. The entities may be sorted by using the reduced graph such that a new graph may be generated based on the generated cyclic sets, where the new graph may be acyclic due to the grouping of the entities into corresponding cyclic sets.

Constraint resolution engine 224 may topologically sort the cyclic sets, such that each cyclic set may be assigned a unique ordering number that may be different from other cyclic sets. The entities represented by vertices or nodes included in the cyclic sets may also be assigned the same ordering number that may be assigned to their respective cyclic sets. For example, cyclic set with a single element representing database table 358 of FIG. 3B may be assigned an ordering number 1; cyclic set containing two elements representing database tables 352 and 354 of FIG. 3B may be assigned an ordering number 2; and cyclic set containing a single element representing database table 356 of FIG. 3B may be assigned an ordering number 3.

An ordering number may determine an execution order in which queries corresponding to entities may be processed. The ordering numbers may be assigned in linear time proportion to the number of vertices and arrows on the new graph. A record of the assigned ordering numbers may be stored in memory device 216 by constraint resolution engine 224 for use in execution of queries received by, for example, user device 104a. For example, a record of the assigned numbers may be stored in entity relationship model 222.

User device 104a may send one or more queries to server 206. The queries may be based on a query transaction that may need to be completed by using data objects 234 stored in related database tables 232. Query processing module 226 may process the queries and server 206 may complete the query transaction based on the types of queries and assigned ordering number stored in memory device 216. A query transaction may include multiple insertion, deletion, and update functions which may be performed in a specific order. For example, query processing module 226 may divide the entities, represented by data objects involved in the query transaction into three separate groups.

The first group may include entities in the state of "to be inserted," the second group may include entities in the state of "to be updated," and the third group may include entities in the state of "to be deleted." The divided groups may then be separately processed by constraint resolution engine 224. The processing order may be such that join table instances or data objects of entities which should be deleted may be deleted first, followed by new data objects of entities that should be inserted may be inserted. The new data objects of entities may be sorted by the number assigned to their respective entities and additionally by values of the data objects when a particular class is a part of a cycle. Subsequent to the insertion of new data objects, changed data objects may be updated. An ordering number may not be required for the update operation, however, a specific order may be assigned to avoid deadlocks. Data objects corresponding to entities in the state "to be deleted" may be deleted after the changed data objects are updated, where the data objects are deleted based on the number assigned to their respective entities and additionally by values of data objects when a particular class is part of a cycle. In the end, all join table entries of entities to be inserted may be inserted.

Constraint resolution engine 224 may arrange the first group of entities based on the ordering number that may have been assigned to their cyclic set and that may be stored in memory device 226. The first group may include entities that may have potential cyclic relationship due to the insertion of data objects. These potential cyclic relationships may need to be topologically sorted by constraint resolution engine 224. Constraint resolution engine 224 may topologically sort the entities in the second group or may return an error when it may be unable to sort the entities.

When the first group may not include additional cyclic relationships or when the potential cyclic relationship are sorted, additional operations may be performed to execute the database query and insert data objects. For example, new data objects may need to be inserted in a database table and a secondary table. The secondary table may correspond to arrows of the directed graph that may represent the one-to-many relationships or many-to-many relationships. New data objects may be inserted in the sequence identified by the ordering numbers stored in memory device 216 and/or by the ordering numbers assigned after potential cyclic relationships are sorted. When two new data objects that have the same ordering number because they are of the same entity need to be inserted, the instances may be entered based on their values.

New data objects may be inserted in a database table after data objects of entities to be deleted are deleted from a secondary table and new data objects may be inserted in the secondary table subsequent to the updating of changed data objects and deletion of data objects from the database table. The ordering number may therefore account for any foreign key constraints that may be present when inserting an entity in related database tables from database tables 232.

The second group of entities may not create foreign key violations since the third group of entities may be those "to be updated" in database tables 232 by constraints resolution engine 224 in an arbitrary order. For example, constraints resolution engine 224 may update data objects 234 stored in one or more of related database tables 232 in an update order indicated by predetermined values stored in memory device 216. For example, the predetermined values may be provided by a user and stored in constraint resolution engine 224 and/or query processing module 226. The entities to be updated may be updated after deletion of join table entries of entities to be deleted and after insertion of new entities.

Following an order based on the type of queries, constraint resolution engine 224 may arrange the third group of entities based on an order that is the reverse of the ordering number that may have been assigned to their cyclic sets. When two data objects of an entity to be deleted have the same ordering number the values of the data objects may be used to decide the order of deletion. For example, an entity may have data objects stored in a first database table and a secondary database table from database tables 232. Constraint resolution engine 224 may first delete the entry in the secondary database table, and may delete the corresponding entry in the first database table after new data objects have been inserted in the database tables and changed data objects have been updated. Using the reverse of the order number to delete data objects may therefore resolve foreign key constraints that may be enforced by a corresponding foreign key 238.

Once the query transaction may be completed query processing module 226 may send a notification back to user device 104a that the query transaction has been completed. In the event that the query transaction is not successful, processing module 226 may send an error message to user device 104a to indicate that one or more queries of a query transaction may have not been completed.

Figure 4:
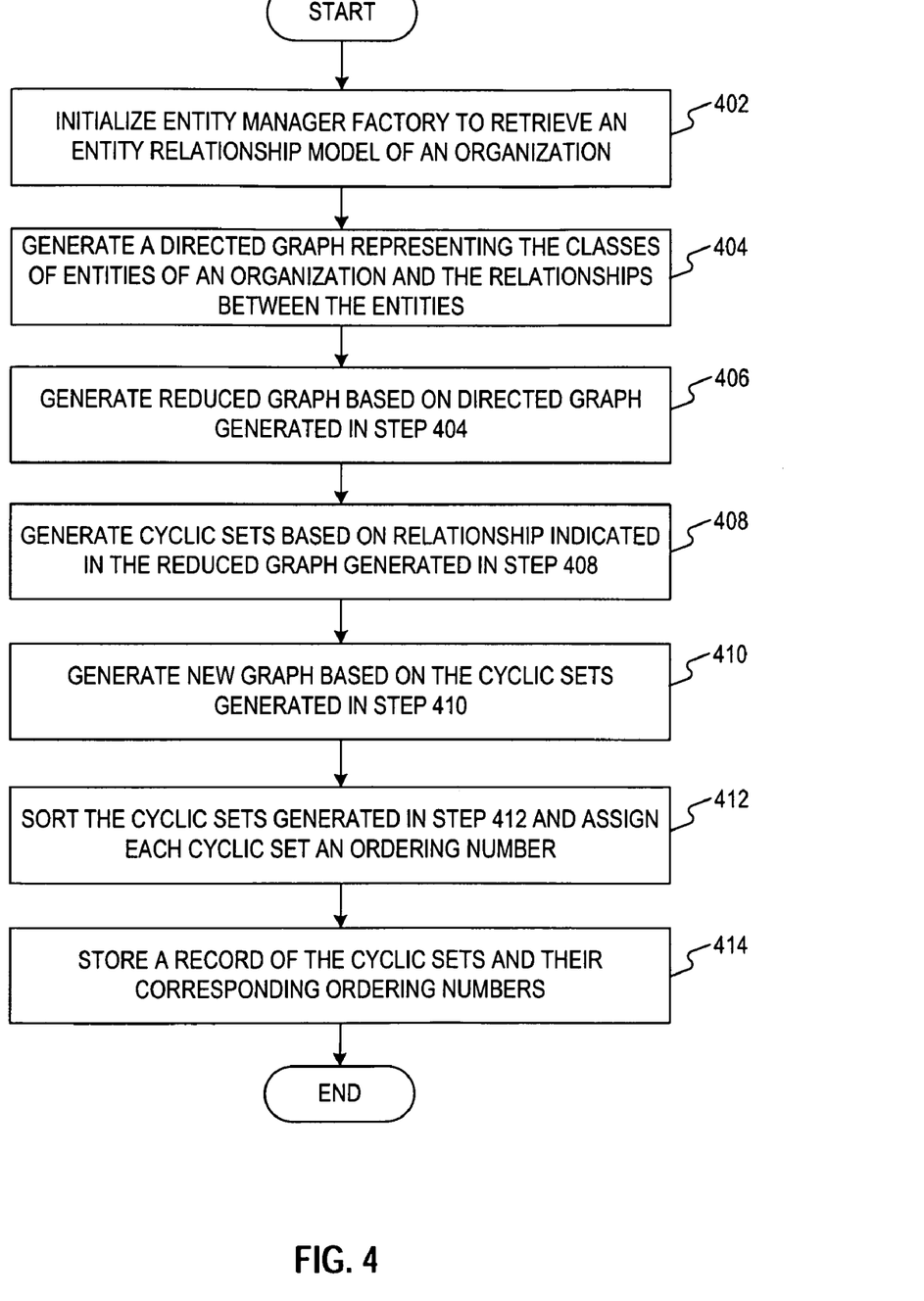
FIG. 4 illustrates a flowchart illustrating an exemplary process 400 for sorting entities represented by data objects stored in database tables, consistent with the present invention.

Referring now to FIG. 4, it illustrates an exemplary flowchart of a process 400 for sorting entities having corresponding data objects that may be stored in database tables. Process 400 may be implemented using server 206 or other systems known to those of skill in the-art. The process may begin in step 402 where an entity manager factory 220 may be initialized to retrieve an entity relationship model 222 of an organization. From the entity relationship model, a directed graph may be generated representing the relationships between the entities (step 404). The vertices or nodes of the directed graph may correspond to entities and arrows of the directed graph may represent the relationships between the entities. Relationships between the entities may be one of one-to-one, one-to-many, many-to-one, and many-to-many. The graph may be a coarse. These relationships may also represent the relationships between database tables 232 used to represent the entities such that the relationships in the database tables may be enforced by using foreign key constraints 238.

Next, in step 406, a reduced graph may be generated based on the directed graph. The reduced graph may be generated by removing arrows from the directed graph that may indicate relationships which are modeled by a join table (or other helper table). Certain relationships may be implemented with join tables and this may be indicated by, for example, Java Persistence API 1.0 or other similar specifications. The removed arrows may represent, for example, a one-to-many relationship between two entities and their corresponding database tables 232.

Next, in step 408, the entities and their corresponding database tables 232 may be sorted to generate cyclic sets based on the relationships in the reduced graph. For example, the sorting may be a topological process where all entities that may have a cyclic relationship may be determined and cyclic sets may be generated where each element of a cyclic set may represent an entity which has the same cyclic relationship with all the elements of the cyclic set. Similarly, an element in one cyclic set may not have a cyclic relationship with an element in a second set. Each element may be represented based on the value of the vertex or node that represents the corresponding entity on the reduced graph. Next, in step 410, a new graph may be generated based on the cyclic sets.

The process may then move to step 412, where the cyclic sets may be sorted such that each cyclic set may be assigned a unique ordering number that may differ from an ordering number assigned to another cyclic set. The database elements of each cyclic set that represent an entity and their corresponding database tables 232 may also be assigned the same unique sorting number assigned to the cyclic set that includes those database elements. The ordering numbers may be assigned in linear time proportional manner to the number of vertices and arrows in the new graph generated in step 410. Next, in step 414, a record of the cyclic sets and a record of ordering numbers assigned to each element in the cyclic sets may be stored in the organization's repository, for example 208a. Database elements in the cyclic sets may represent entities and corresponding database tables 232 of the organization.

Figure 5:
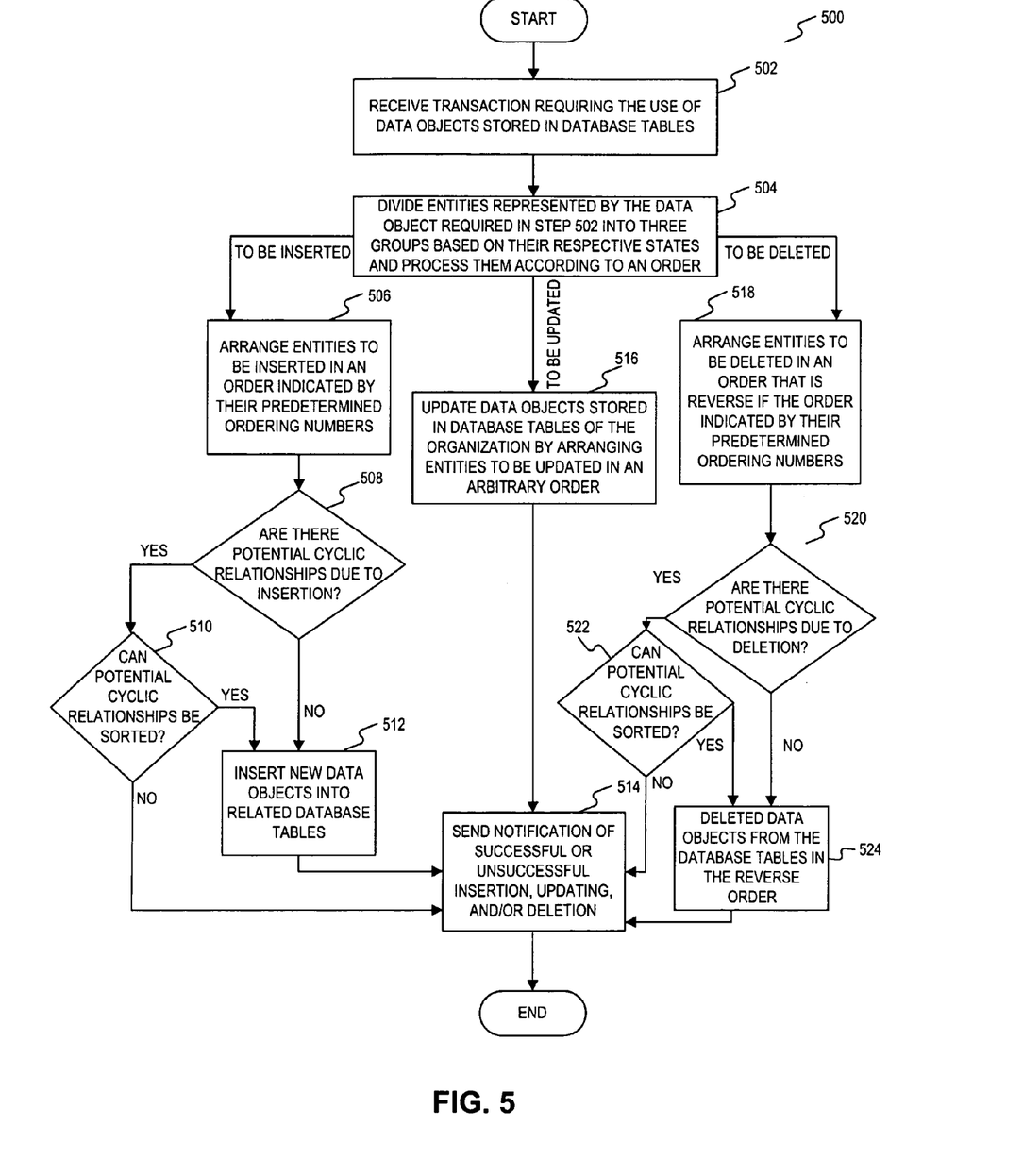
FIG. 5 illustrates an exemplary process 500 of executing a query transaction based on previously stored ordering numbers, executing process 400.

FIG. 5 illustrates an exemplary process 500 of executing a query transaction based on previously stored ordering numbers that may be generated by, for example, executing process 400. The process may thus begin in step 502, where a query transaction may be received that may need to be executed by using data objects or instances 234 stored in database tables 232 of an organization. The query transaction may include addition of new data objects or instances into database tables 232. Next, in step 504, entities represented by database tables 232 may be divided into three groups based on the states of the entities for completing the query transaction in an order based on a type of transaction. For example, the entities in the state "to be deleted" may be in a separate group from the entities in the state "to be inserted," and similarly the entities in the state "to be updated" may be in a different group.

The processing order of steps 506-520 may be such that join table data objects of entities in the state "to be deleted" may be deleted first, followed by new data objects that should be inserted may be inserted. The new data objects may be sorted by the number assigned to their respective entities and additionally by values of data objects when a particular entity is a part of a cycle. Subsequent to the insertion of new entities, changed entities may be updated, where the entities are updated based on an arbitrary order assigned to them to avoid deadlock. Data objects may be deleted after the changed data objects are updated such that the data objects are deleted based on the number assigned to their respective entities and additionally by values of data objects when a particular entity is part of a cycle. In the end, all join table data objects to be inserted may be inserted.

In step 506 if the query transaction includes inserting data objects into database tables 232, the data objects may arranged in the order as may be indicated by the predetermined ordering numbers that may be assigned to their cyclic sets. For example, the ordering number may be stored in a memory device of the organization. Next, in step 508, it may be determined if there are potential cyclic relationships caused due to the insertion. The method may move to step 510 where it may be determined if the potential cyclic relationships may be sorted.

Once cyclic relationships are sorted, or if it is determined that there were no potential cyclic relationships (step 508: No), the method may moves to step 512. In step 512, new data objects that may need to be inserted into related database tables 232 may be inserted in an order indicated by the predetermined ordering numbers. The ordering number may indicate that data objects may be inserted in a primary database table and then subsequently may also be inserted in a secondary database table. The primary database table may be, for example, table 352 of FIG. 3B, and the secondary database table may be, for example, table 360 of FIG. 3B. The process may move to step 514 where a notification may be sent indicating that the insertion of data objects has been successfully completed, and the process may end. Alternatively, an error may be encountered during steps 506-512 and an error notification may be sent, in step 514, and the process may end. For example, it may be determined, in step 510, that the potential cyclic relationships may not be sortable and the process may move to step 514 to send an error notification. It should be noted that new entities may be inserted after all join table entries of entities to be deleted are deleted and join table entries of entities to be inserted are inserted after changed entities are updated and entities to be deleted are deleted.

Returning now to step 504, the process may performs steps 516 and 514 to process changed data objects that may be in the state "to be updated." Foreign key violations may not be caused during update operations and therefore, in step 516, the data objects stored in the related database tables may not be updated in a specific order. However, in order to avoid deadlocks, the data objects to be updated may be assigned an update order based on predetermined values provided by a user. Next, the method may move to step 514. If database tables 232 have been updated successfully and successful notification may be sent in step 514 or an error notification may be sent if the updating was unsuccessful, and the process may end. It should be noted that changed entities may be updated after all join table entries of entities to be deleted are deleted and new entities are inserted.

Returning now to step 504, the process may perform steps 518, 520, 522, 524, and 514 to process data objects that may be in the state "to be deleted." In step 518, the "to be deleted" data objects may be arranged in an order that may be a reverse of the order indicated by the predetermined ordering numbers that may be assigned to the cyclic sets of the corresponding entities. Next, in step 520, it may be determined if there are potential cyclic relationships that may be caused due to the deletion. The method may move to step 522 where it may be determined if the potential cyclic relationships may be sorted. Once cyclic relationships are sorted, or if it is determined that there were no new potential cyclic relationships (step 520: No), the method may moves to step 524. In step 524, data objects 234 that may need to be deleted from related database tables 232 may be deleted in the reverse order. For example, the ordering number may indicate that the data objects or entries of the entities to be deleted may be deleted from a secondary database table followed by the deletion in the primary table and/or deletion of the entity if no other data objects remain in the database table corresponding to the entity. The process may move to step 514 where a notification may be sent indicating that the deletion of data objects has been successfully completed, and the process may end. Alternatively, an error may be encountered during steps 518 to 524 and an error notification may be sent, in step 514, and the process may end.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A computer-implemented method of executing a query transaction by using data objects stored in database tables corresponding to entities of an organization, comprising:
generating, via a processor, an entity relationship model to indicate a plurality of types of relationships between the entities;
determining relationships between the database tables corresponding to the entities by using the entity relationship model, wherein the database tables are stored in a computer memory device;
generating a graph based on the entity relationship model, the graph representing dependencies between the database tables, wherein the graph includes a vertex to represent one of the entities and an indicator to represent one of the relationships between the database tables;
generating sets of database elements representing the entities and corresponding data objects stored in the database tables, wherein the element sets are generated based on the generated graph;
assigning ordering numbers to the database element sets and database elements included in the database element sets; and
executing the query transaction by using the data objects in an order based on the ordering numbers.

2. The method of claim 1, wherein the entity relationship model is represented by a directed graph having vertices representing the entities and arrows representing relationships between the entities.

3. The method of claim 2, wherein the relationships between the entities are of at least one of types one-to-one, one-to-many, many-to-one, and many-to-many.

4. The method of claim 3, wherein the generated graph is a reduced graph that is generated based on the directed graph.

5. The method of claim 1, wherein the entity relationship model defines foreign key constraints that are used to enforce the relationships between the database tables.

6. The method of claim 1, wherein the sets are cyclic sets, such that each database element in one of the sets is in a cyclic relationships with all the remaining database elements of the one set, and the database elements of the one set are not in a cyclic relationship with database elements of a second one of the sets.

7. The method of claim 1, wherein the query transaction comprises one or more of insertion, deletion and update operations.

8. The method of claim 7, wherein the order of execution of the query transaction is based on a type of the operation, such that when the query transaction is an insertion operation, the transaction is executed in the same order as indicated by the ordering numbers.

9. The method of claim 7, wherein the execution order of the query transaction is based on a type of the operation, such that when the query transaction is a deletion operation, the transaction is executed in a sequence reverse to the one indicated by the ordering numbers.

10. The method of claim 1, wherein the entity relationship model is generated by determining the entities and the plurality of types of relationships based on metadata stored in databases of the organization.

11. The method of claim 1, wherein the execution order of the query transaction is based on a type of the operation, such that when the query transaction is an update operation, the transaction is executed in an arbitrary sequence provided by a user.

12. A computer-implemented system for executing a query transaction by using data objects stored in database tables corresponding to entities of an organization, comprising:
a memory device including a plurality of modules; and
a data processor for executing the plurality of modules to:
generate an entity relationship model to indicate a plurality of types of relationships between the entities;
determine relationships between the database tables corresponding to the entities by using the entity relationship model, wherein the database tables are stored in a computer memory device;
generate a graph based on the entity relationship model, the graph representing dependencies between the database tables, wherein the graph includes a vertex to represent one of the entities and an indicator to represent one of the relationships between the database tables;
generate sets of database elements representing the entities and corresponding data objects stored in the database tables, wherein the element sets are generated based on the generated graph;
assign ordering numbers to the database element sets and database elements included in the database element sets; and
execute the query by using the data objects in an order based on the ordering numbers.

13. The system of claim 12, wherein the plurality of modules include an entity manager factory, a constraint resolution engine, and a query processing module.

14. The system of claim 12, wherein the entity relationship model is a directed graph having vertices representing the entities and arrows representing relationships between the entities.

15. The system of claim 14, wherein the relationships between the entities are of at least one of types one-to-one, one-to-many, many-to-one, and many-to-many.

16. The system of claim 15, wherein the generated graph is a reduced graph that is generated based on the directed graph.

17. The system of claim 13, wherein the entity relationship model defines foreign key constraints that are used to enforce the relationships between the database tables.

18. The system of claim 12, wherein the sets are cyclic sets, such that each database element in one of the sets is in a cyclic relationships with all the remaining database elements of the one set, and the database elements of the one set are not in a cyclic relationship with database elements of a second one of the sets.

19. The system of claim 1, wherein the query transaction comprises one or more of insertion, deletion and update operations, and the order of execution of the transaction is based on the type of the operation being performed.

20. A computer-readable storage medium comprising instructions, which when executed on a processor, cause the processor to perform a method of executing a query transaction by using data objects stored in database tables corresponding to entities of an organization, the method comprising:
generating an entity relationship model to indicate a plurality of types of relationships between the entities;
determining relationships between the database tables corresponding to the entities by using the entity relationship model;

generating a graph based on the entity relationship model, the graph representing dependencies between the database tables, wherein the graph includes a vertex to represent one of the entities and an indicator to represent one of the relationships between the database tables;

generating sets of database elements representing the entities and corresponding data objects stored in the database tables, wherein the element sets are generated based on the generated graph;

assigning ordering numbers to the database element sets and database elements included in the database element sets; and executing the query transaction by using the data objects in an order based on the ordering numbers.

* * * * *